US006622164B1

(12) United States Patent
Harrison et al.

(10) Patent No.: US 6,622,164 B1
(45) Date of Patent: Sep. 16, 2003

(54) MASS STORAGE DEVICE WITH NETWORK INTERFACE

(75) Inventors: Joel N. Harrison, Monte Sereno, CA (US); Joshua Lindsay, Woodside, CA (US); Michael Leis, Framingham, MA (US)

(73) Assignee: Quantum Corp., Milpitas, CA (US)

( * ) Notice: Subject to any disclaimer, the term of this patent is extended or adjusted under 35 U.S.C. 154(b) by 0 days.

(21) Appl. No.: 09/152,035

(22) Filed: Sep. 11, 1998

(51) Int. Cl.[7] .............................................. G06F 15/16
(52) U.S. Cl. ...................... 709/217; 709/219; 361/684; 361/685; 361/686
(58) Field of Search ................................ 709/226, 217, 709/219; 710/51, 63, 62, 64, 65; 713/310; 323/241; 361/686, 684, 685; 360/97.01, 97.03, 98.01; 369/13.01, 14

(56) References Cited

U.S. PATENT DOCUMENTS

| | | | | |
|---|---|---|---|---|
| 5,335,352 A | * | 8/1994 | Yanai et al. .................... 710/51 |
| 5,548,728 A | * | 8/1996 | Danknick .................... 709/213 |
| 5,550,710 A | * | 8/1996 | Rahamim et al. ........... 361/686 |
| 5,608,608 A | * | 3/1997 | Flint et al. .................... 361/683 |
| 5,852,724 A | * | 12/1998 | Glenn, II et al. ........... 709/226 |
| 5,896,508 A | * | 4/1999 | Lee ............................. 370/434 |
| 5,925,119 A | * | 7/1999 | Maroney .................... 710/126 |
| 5,931,918 A | * | 8/1999 | Row et al. .................. 709/321 |
| 5,951,648 A | * | 9/1999 | Kailash ...................... 709/235 |
| 5,966,510 A | * | 10/1999 | Carbonneau et al. ......... 710/18 |
| 6,026,454 A | * | 2/2000 | Hauck et al. ................ 709/321 |
| 6,041,354 A | * | 3/2000 | Biliris et al. ................ 709/226 |
| 6,094,699 A | * | 7/2000 | Surugucchi et al. ........ 710/314 |
| 6,098,119 A | * | 8/2000 | Surugucchi et al. .......... 710/10 |
| 6,170,062 B1 | * | 1/2001 | Henrie ........................ 713/340 |
| 6,219,727 B1 | * | 4/2001 | Kailash et al. .............. 709/321 |
| 6,256,740 B1 | * | 7/2001 | Muller et al. ............... 713/201 |
| 6,282,045 B1 | * | 8/2001 | Glover ...................... 360/73.03 |
| 6,289,398 B1 | * | 9/2001 | Stallmo et al. ................. 710/5 |
| 6,298,386 B1 | * | 10/2001 | Vahalia et al. .............. 709/203 |
| 6,300,847 B1 | * | 10/2001 | Gallagher et al. .......... 333/246 |
| 6,324,608 B1 | * | 11/2001 | Papa et al. ................... 361/686 |
| 6,345,309 B2 | * | 2/2002 | Ohsawa et al. ............. 709/250 |
| 6,359,894 B1 | * | 3/2002 | Hong et al. ................. 370/389 |
| 6,392,892 B1 | * | 5/2002 | Sobolewski et al. ........ 248/634 |
| 6,396,391 B1 | * | 5/2002 | Binder .................. 340/310.01 |

OTHER PUBLICATIONS

Bolles, "Dial–Up Duo: Two Full–Featured Asynchronous Communications Programs", Copyright 1991.*
Bolles, "Dial–Up Duo: Two Full–Featured Asynchronous Communications Programs" Network Computing, Sep. 1, 1991.*
Computer Reseller News, Network Power&light, AutoNet Controller, Sep. 15, 1997, (3 pages).
Snap News & Reviews, Meridian Data Showcases Snap Server And DVD/CD–ROM Networking product Lines at AIIM '98, Jun. 9, 1998 ( 3 pages).
Snap News & Reviews, Meridian Data Previews New Category of Low–Cost, Network–Attached Storage Server AT DEMO '98, Jun. 9, 1998 (3 pages).

* cited by examiner

Primary Examiner—Mark R. Powell
Assistant Examiner—William C. Vaughn, Jr.
(74) Attorney, Agent, or Firm—Michael Zarrabian

(57) ABSTRACT

A network storage device having a network controller card and a data storage device is described herein the card and storage device are either enclosed in a small from factor unit or assembled together to fit within a standard hard disk drive bay in a computer. The combination of a controller card and storage device is designed to transfer files from and to a network using standard network file protocols. As the network storage device does not process the files, much of the computational overhead of a network server can be eliminated, resulting in a simpler device capable of faster file exchange.

34 Claims, 6 Drawing Sheets

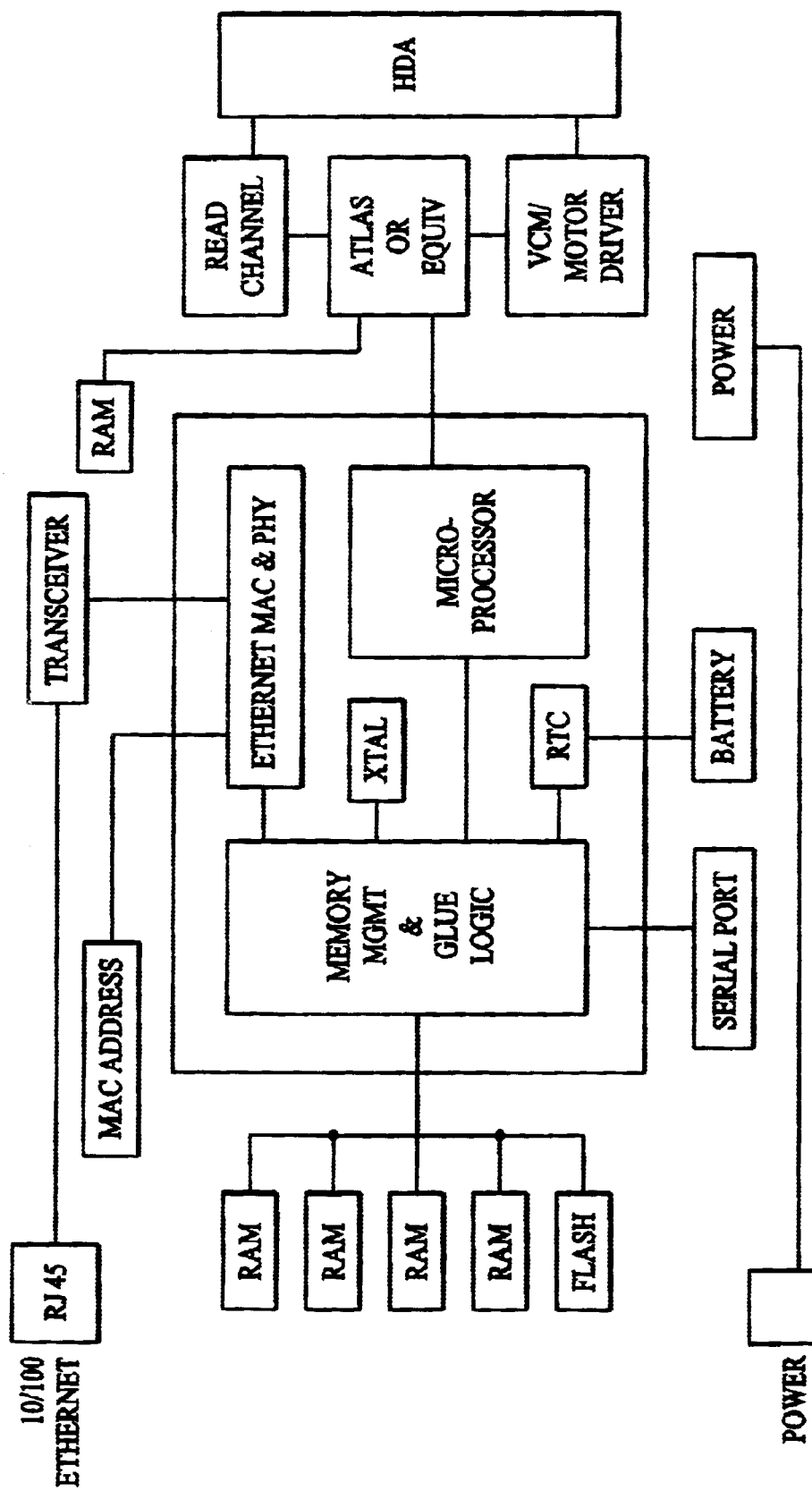

MASS STORAGE DEVICE WITH NETWORK INTERFACE

BACKGROUND OF THE INVENTION

This invention is in the field of mass storage devices for use with computers and computer networks. More particularly it relates to mass storage devices directly coupled to computer networks.

The Internet, a collection of publicly accessibly computer networks, and Intranets, collections of privately accessibly business computer networks, are known. Both have witnessed explosive growth in the last few years. In 1996, the number of users of the Internet was estimated to be doubling every two months. This explosive growth has fueled an equally explosive demand for mass storage devices capable of supporting both Internet and Intranet applications.

FIG. 1 is a block diagram showing a common architecture for supporting Internet/intranet operations. Individual clients 1 using either personal computers or workstations are coupled through a network 3 to one or more servers 5. Each server is typically a general purpose computer, which computer uses either the Unix or Windows NT operating system. The server in turn is coupled to a plurality of mass storage devices 7, which may include hard disk drives ("HDD"s), archival tape storage devices, here shown as Digital Linear Tape drives, or any other known form of mass storage devices.

This architecture has several disadvantage. All data must travel through a general purposes server before it can be sent to a client from a data storage device or written to a data storage device from a client, which slows data transfer. The client/server architecture is also expensive to purchase and to maintain. Scaling this architecture requires adding both additional processors and additional memory. Installation of either memory or processors is almost never a straightforward process and any upgrades of the system require that the servers be shut down.

As these disadvantages of the client/server architecture are known, attempts have been made either to correct or simply avoid them. One commercially available product is a thin file server through which storage devices are connected for direct network attached access via Unix or Windows clients. The file server/controller couples disk drives and RAID arrays to a network, without the need for a server. Although this device allows for some improvement on the known client/server architecture, it still requires both a separate controller and a storage device. The controller itself also requires a full 3.5" disk drive bay for installation. Thus, the combination of the file server/controller and a storage device requires at least two bays in either a rack-mounted configuration or two of the internal bays found in most personal computers and network servers.

The meridian Data System Inc. Snap! Server incorporates an HDD with a network controller card into a single unit. However, the device's controller card uses an X86 microprocessor, which is expensive, uses more power than desirable in this application, and is somewhat slower in operation than other commercially available microprocessors.

The controller card and HDD are not well integrated, the package itself is large and a "Y"-connector cord is required to provide power to both the controller card and the HDD.

SUMMARY OF THE INVENTION

A first embodiment of the present invention is a single device combining a HDD and a network controller card. The combination, hereinafter called a network storage device, can be coupled to network, which networks operate using standard Ethernet protocols. The network storage device has an extremely small form factor which fits into a standard disk drive storage bay (4"×5.75"×1.625" or 1.0"). Two embodiment of the network storage device are described herein. A first embodiment comprises a network controller card and a HDD, integrated together as a single package. A plurality of units of this first embodiment could then be rack-mounted and collectively powered from a single source of DC power and provided with individual network connections. In a second embodiment, the network controller card, one or more HDDs, and power supply are integrated within a housing and the housed, finished unit requires only a network connection and an AC power source connection.

This combination of storage device and network controller device offers many advantages. A single package of small size can supply the functionality of two separate devices, the single device having lower overall power consumption and smaller physical footprint, typically within the form factor of a standard HDD. Internal power connection is simplified, with a single external power input to the network controller card which in turn provides power to the HDD. The combination is also less expensive than the separate controller unit and storage device shown by the prior art.

BRIEF DESCRIPTION OF THE ILLUSTRATIONS

FIG. 7 is a block diagram of the network storage device's electronics in a fourth preferred embodiment.

DETAILED DESCRIPTION OF THE PREFERRED EMBODIMENTS

Figure 1:
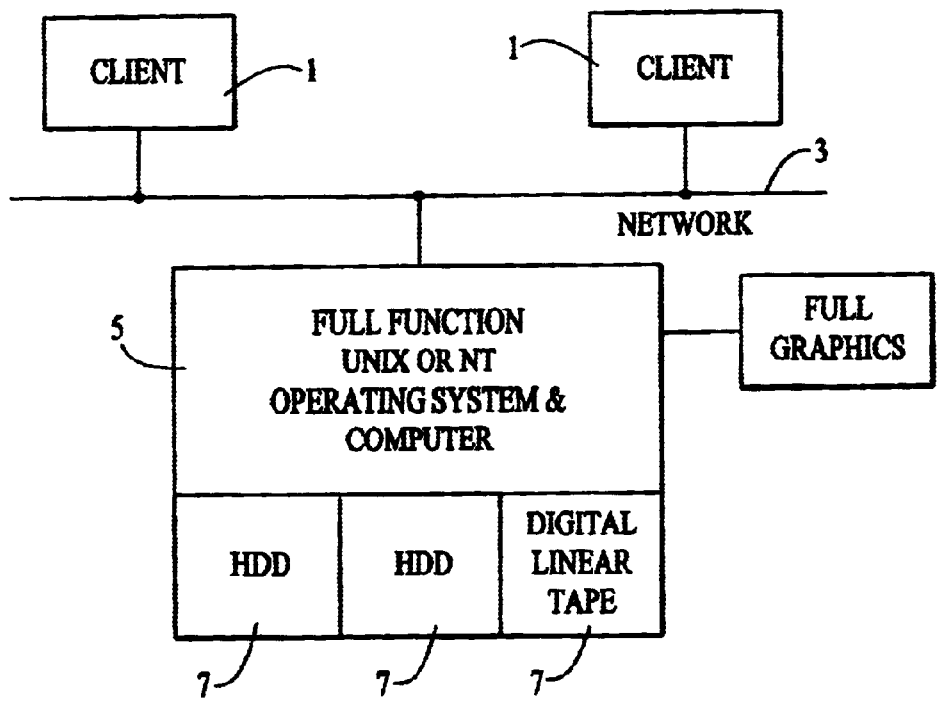
FIG. 1 is a block diagram of client-server computer system (Prior Art)
Figure 2:
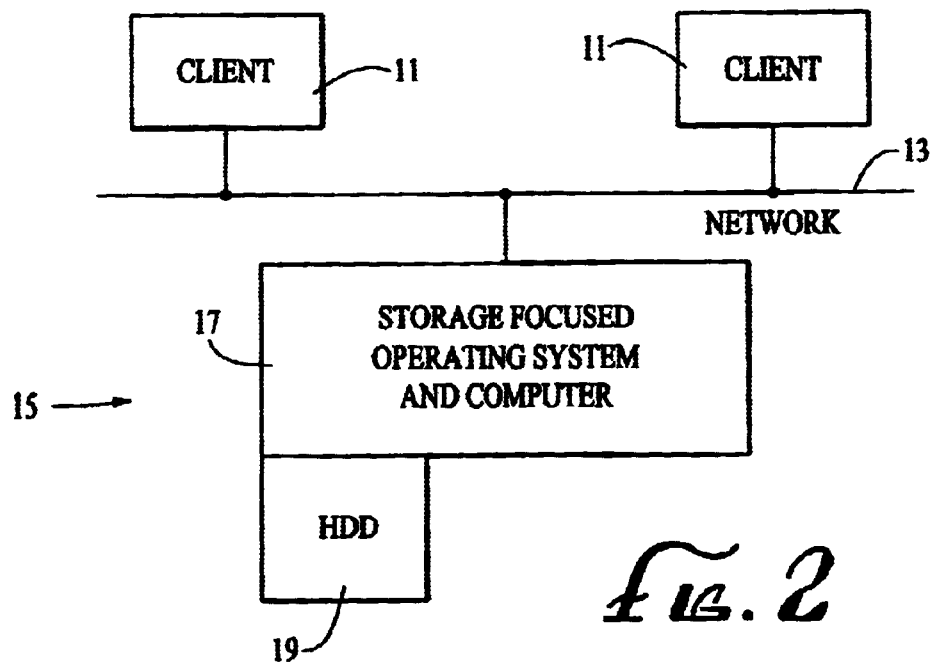
FIG. 2 is a diagram of a computer network with a plurality of clients and a server, wherein data storage is additionally provided by a network storage device.

The proposed architecture for the first embodiment of the present invention is shown in FIG. 2. Client PCS 11 and NT server 14 are coupled together through network hub 13. Several peripherals such as tape backup storage 16 and printer 18 are also connected to the network. Network storage device 15 is also attached to the network through hub 13.

Network storage device 15 is comprised of a network controller card 17 (see FIG. 3) for receiving and transmitting network compatible files over the network and storage device 19 (see FIG. 3), which stores the files received from network controller card 17. In this first embodiment the network is an Ethernet network, the storage device is a hard disk drive ("HDD"), and the controller card accepts files in both a Microsoft compatible format (SMB/CIFS) or in a Unix compatible format (NFS).

This architecture allows one network storage device to serve many clients without the expense and complication of an additional layer created by a server computer. When servers are used primarily for data storage, the server is very rarely used to process the data being sent to it from the clients coupled to it and the server microprocessor is underutilized and therefore unnecessary overhead. This first embodiment substitutes a controller card optimized to transfer files of data between a storage device and clients for the sever computer. As the microprocessor does not process the data contained in the files, it can be simpler, more efficient device designed for this particular purpose, rather than the general purpose computer that comprises most servers.

Figure 3:
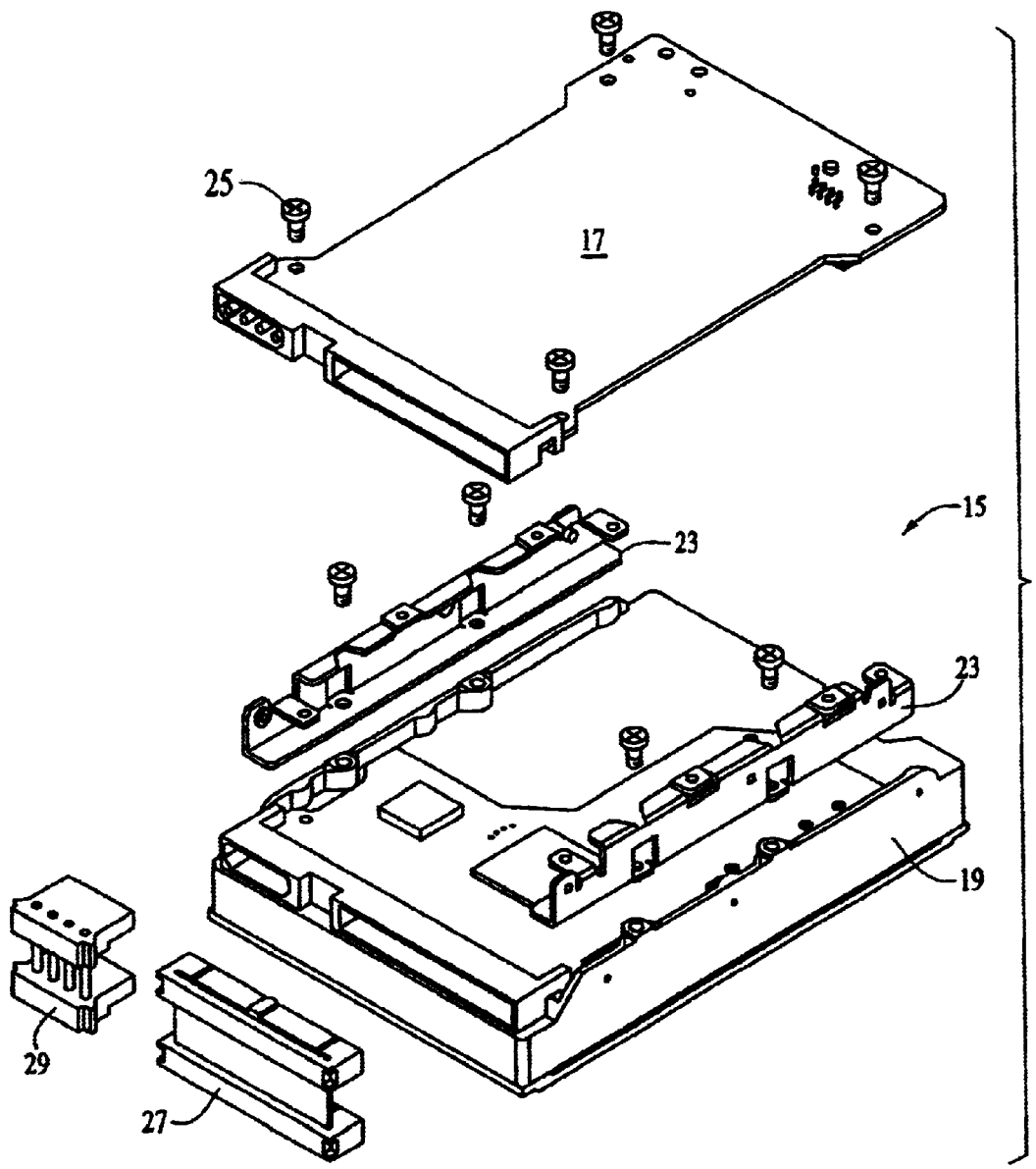
FIG. 3 is an exploded isometric drawing illustrating the relative placement of the network controller card and HDD in a first preferred embodiment of the network storage device.

FIG. 3 is an exploded isometric drawing of network storage device 15. Network storage device 15 contains two main assemblies: network controller card 17 and HDD storage device 9. The two components are coupled together internal frame 23. Standard machine screws 25 attach HDD 19 and controller card 17 to frame 23. Two short connectors 27 and 29 couple controller card 17 and HDD 19 together and carry, respectively, data/addresses and power from the network controller card 17 to HDD 19. Assembled network storage device 15 typically fits within a standard HDD computer bay.

In the second preferred embodiment, the combination of both card 17 and HDD storage device 19, after being mounted together on frame 23, would be placed in a housing, the housing also containing a power supply for card 17 and device 19. The design and operation of such a power supply is known in the art.

In another embodiment, more than one HDD may be attached to the network controller card and installed in a single housing. In this embodiment, the multiple HDDs could be mounted one atop another or one on either side of the network controller card. The data and power buses could be daisy-chained to the additional HDDs in a manner similar to the first preferred embodiment. The mounting of the additional HDDs and the coupling of the data and power busses to the additional HDDs are matters of straightforward mechanical engineering.

Figure 4:
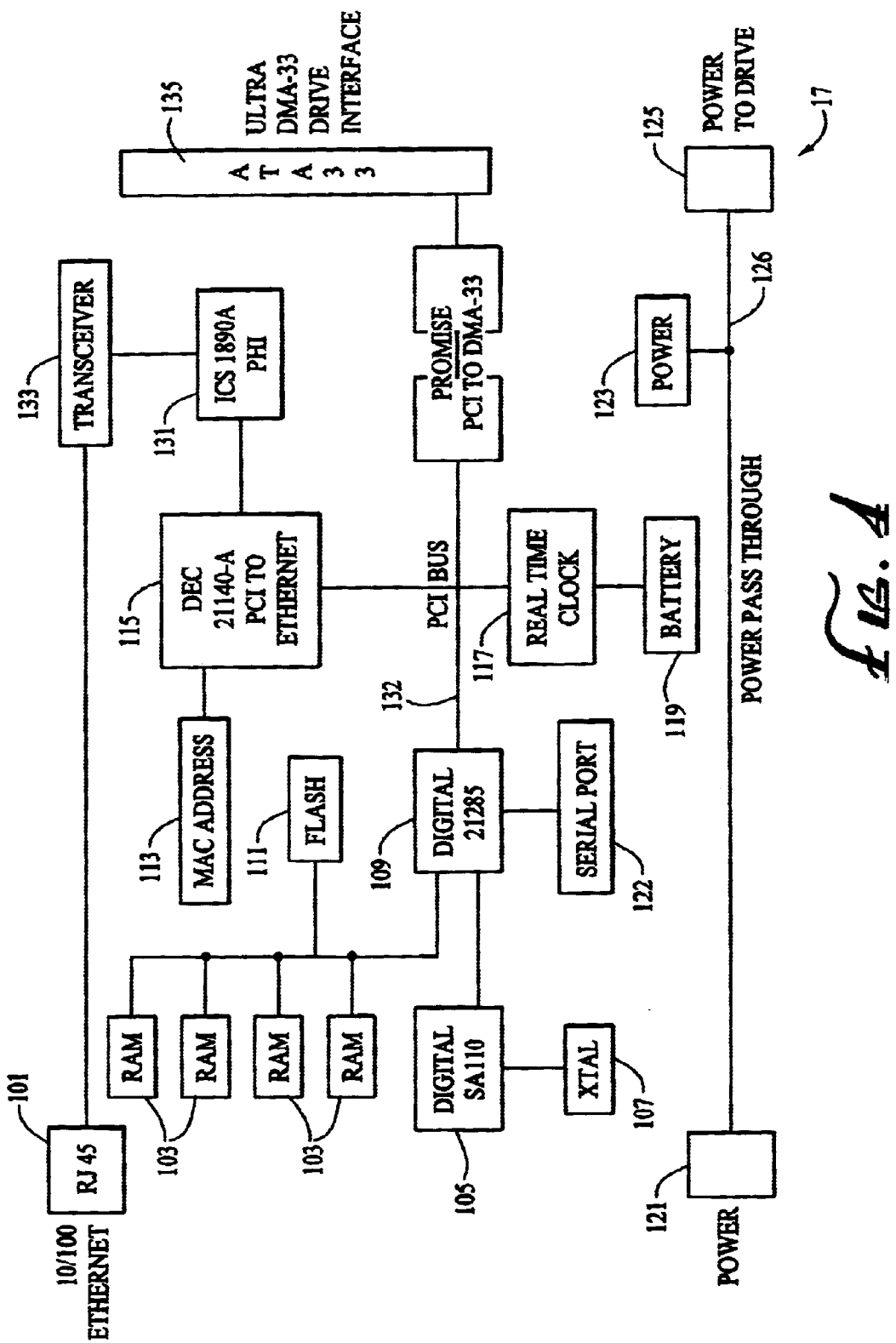
FIG. 4 is a block diagram of the network storage device's network controller card in a first embodiment.

FIG. 4 is a block diagram of network controller card 17. In this first preferred embodiment, RJ 45 connector 101 couples controller card 17 to a 10 or 100 Mb auto-Ethernet network. RJ 45 connector 101 protrudes slightly beyond the physical outline of the HDD to allow flush mounting within the enclosure. Transceiver 133 is in turn coupled to connector 101 and controls file flow into and out of the network storage device. ICS 1890A PHY 131 and DEC 21143-A PCI-to-Ethernet media independent interface 115 are coupled together and provide a network interface. Mac address 113 is coupled to interface 115 and provides a unique address for each individual network storage device. Digital 21285 109 is a PCI bridge and provides memory support and glue logic for controller card operation. Digital SA 110 105 is the controller's microprocessor, regulating file flow from the storage device's PCI bus to the network's Ethernet bus. Crystal 107 is coupled to processor 105 and provides a timing signal.

RAM memory 103 and Flash EEPROM 111 are coupled to PCI Bridge 109. PCI bridge 109 is in turn coupled to PCI bus 132, as well as serial port 122. Real time clock 117 with battery back-up 119 is also coupled to PCI bus 132 and provides time and date information for file stamping purposes. PCI to Ultra ATA-33 controller 127 and 129 control actual data transfer to a storage device using the Ultra ATA-33 protocol through interface 135. Power system 120, comprising power input 121, connectors 123 and 125, and power bus 126, provides power to both controller card 17 and storage device 19.

Controller card 17 provides known functionality and its individual components are commercially available. Power system 120 is designed so that the printed circuit board traces can carry ample current for both controller card 17 and storage device 19, and allows connection of power to both devices without modification of a standard disk drive or use of a "Y"-connector power cord. In operation, the HDD requires 12 V and the controller card 17 requires 5 V. Both network controller card 17 and storage device 19 are low power devices, using approximately 10 watts, reducing the demands on power bus 126 and minimizing thermal dissipation problems within the assembled unit, particularly if the unit is placed in a housing.

Figure 5:
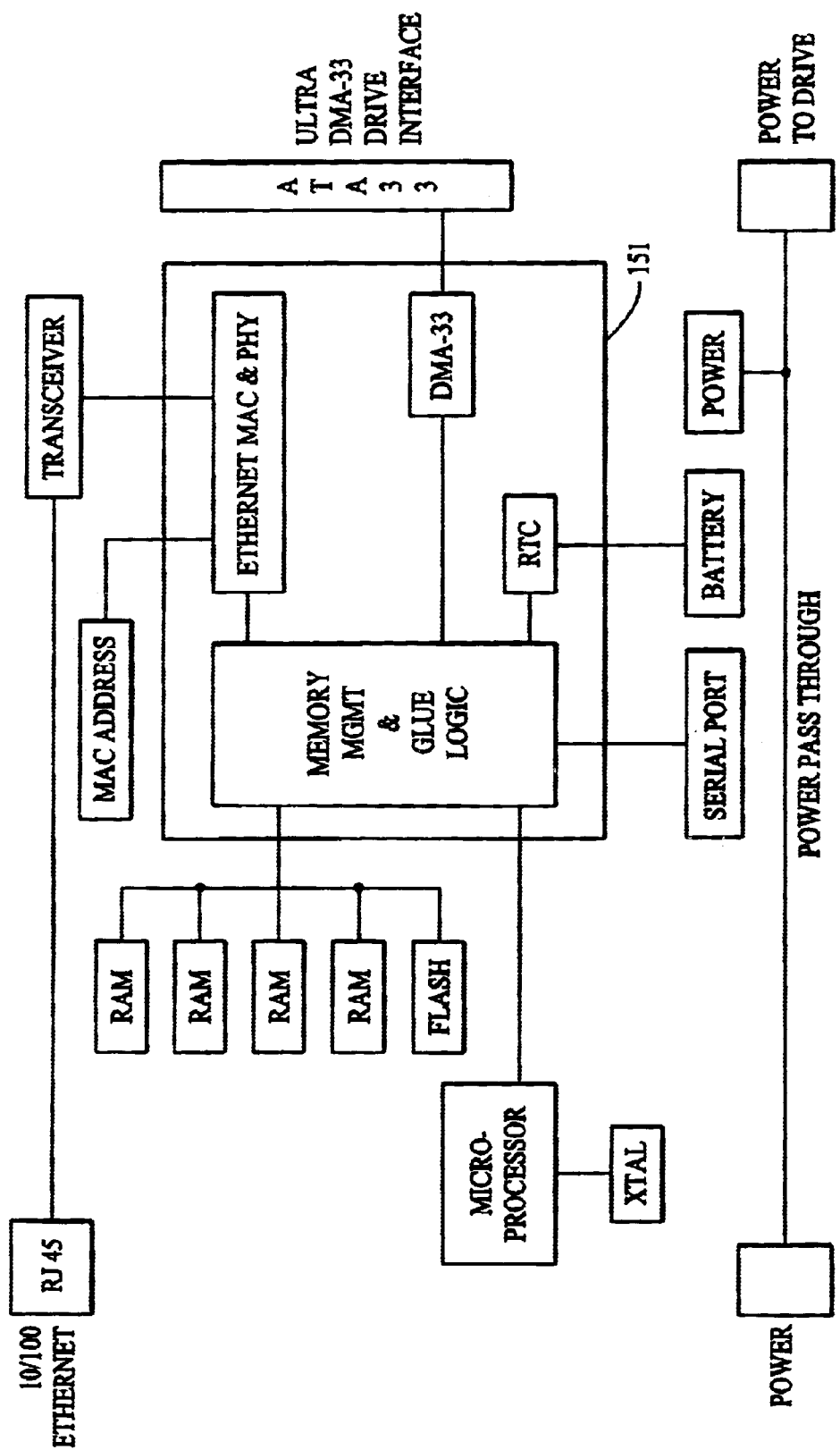
FIG. 5 is a block diagram of the network storage device's network controller card in a second preferred embodiment.
Figure 6:
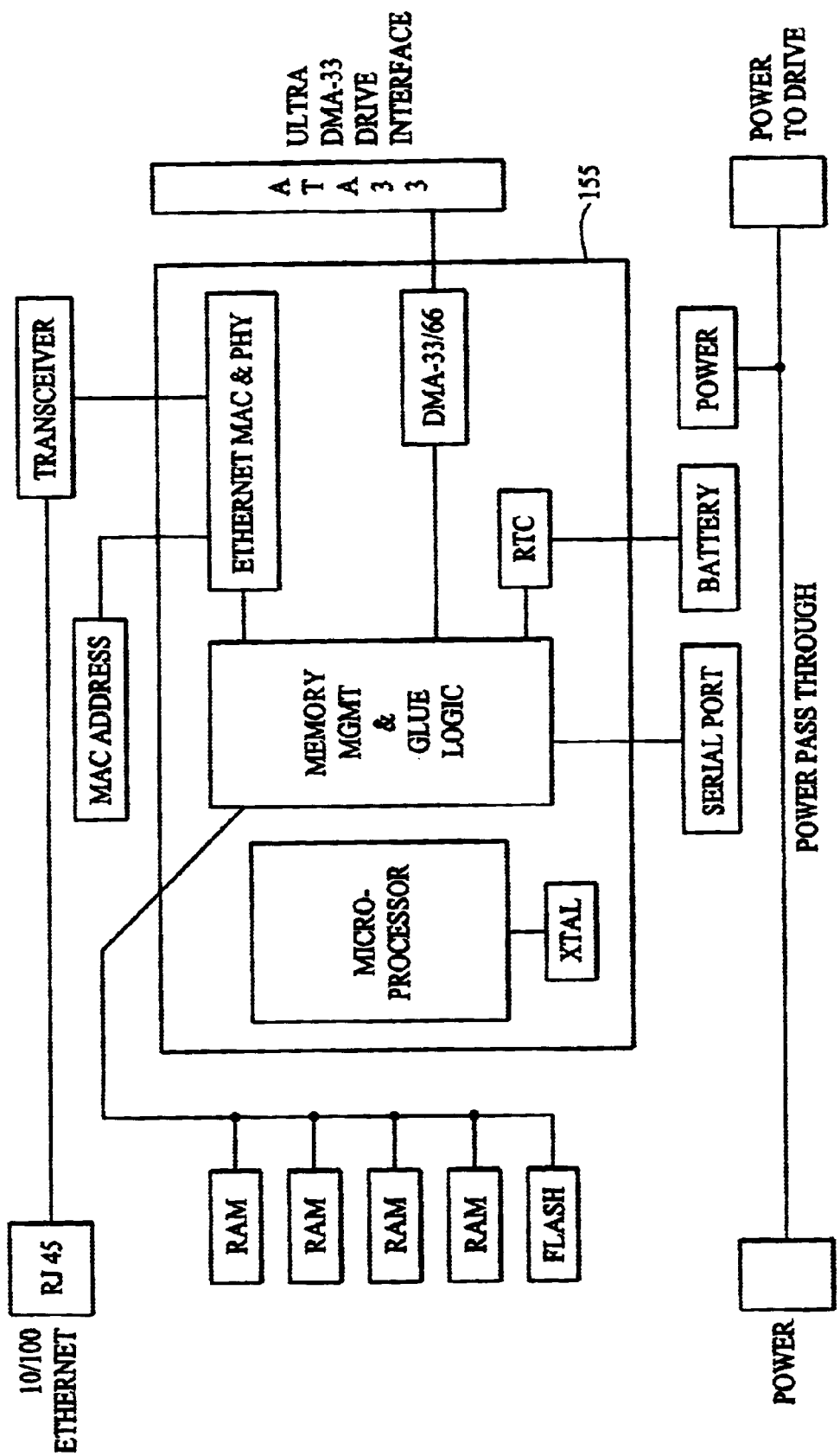
FIG. 6 is a block diagram of the network storage device's electronics in a third preferred embodiment.

In FIGS. 5, 6, and 7, components whose structure and function has not changed retain the same part numbers assigned to them previously herein and shown in FIG. 4.

In a second preferred embodiment of the present invention's network controller card 17, illustrated in FIG. 5, the functions performed by individual units 109, 115, 117, 127, 129, and 131 are now performed by a single custom Application Specific Integrated Circuit ("ASIC") 151. This simplifies the design of the printed circuit board, as well as reducing fabrication difficulties and overall thermal load. In a yet further development of network controller card 17, shown now in FIG. 6, another level of functionality is moved into an ASIC by incorporating a microprocessor into ASIC 155, thereby further eliminating separate blocks 105 and 107 (see FIGS. 4 and 5).

FIG. 7 illustrates yet another embodiment of network controller card 17 wherein the board area freed by the integration of most controller card functions into a single ASIC is used to advantage by moving the controller card electronics onto the HDD's circuit board. As the components and functions of an HDD's circuit board are known, they are not further described herein.

In order to store and retrieve files sent to it from the network, network storage device 15 is provided with a real time operating system for low level functions such as scheduling and memory management. In the first preferred embodiment, the operating system is a VX Works operating system, commercially available from Wind River Systems, Inc. A file system is needed to allow network storage device 15 to store files of data. In this first embodiment, the file system is called File System Stack OS, which is commercially available from Programmed Logic Corp. Programmed Logic Corp also provides the Network File System Layer, which enables network storage device 15 to save files transmitted over the network. This Layer may be either Unix compatible format (Network File System or NFS), or a Microsoft compatible format (Server Message Block or SMB/Common Internet File System or CIFS). Finally, to enable network storage device 15 to communicate over the network, a Network TCP/IP Protocol Stack is also provided. This Stack is also a commercially available product. As these software products are known and commercially available, their design and operation requires no further description herein.

In operation, after network storage device 15 is coupled to a network through connector 101 (see FIG. 4) and power supplied at connection 121, an installation program is run. Running the installation program does not require a rebooting of the managing computer.

The installation program analyzes the network to which device 15 is coupled and recommends a particular IP address for device 15. The system manager can also specify the device's name, the network manager's name and password, as well as device 15's physically location and user and administrative e-mail addresses for future notification of problems. After completion of the installation process, device 15 appears as an icon on the various computer systems coupled to the network, the icon indicating that the device is an available storage device on the network.

If more than one network storage device 15 is coupled to a given network, it is possible for devices 15 to be operated in an automatic backup mode. After a file is written to the first device 15, its operating program may automatically make a copy of the file and send it to a second device 15. If first device 15 fails, then a complete copy of the files on the failed device can be found on the second device 15. In these cases, if the second device 15 detects a failure in first device 15, it can send an e-mail message to the system administrator. If a third device 15 is then coupled to the network to replace the first failed device 15, then the second device 15 will automatically copy all its files to the third device 15, reestablishing a backup file capacity.

What is claimed is:

1. A network storage device comprising:
   a network controller card capable of being coupled to a network and receiving and transmitting files to and from the network, the network controller card including a first power input and a first power output, and additionally having an power circuit thereon for providing electrical power from the first power input to the first power output,
   a data storage device coupled to the network controller card the data storage device storing and later transmitting back files transmitted to the network storage device from the network, wherein the data storage device further includes a second power input coupled to the first power output on the network controller card to electrically power the data storage device via the power circuit of the network controller card.

2. The network storage device of claim 1, wherein:
   the first power input is for receiving sufficient power to supply both the network controller card and the data storage device; and
   the power circuit of the network controller card supplies sufficient electrical power from the first power input to the data storage device via the first power output of the network controller card and the second power input of the data storage device.

3. The network storage device of claim 2, further comprising a power connector for electrically connecting the network controller card and the data storage device to transfer power from the network controller to the storage device.

4. The network storage device of claim 3, wherein the power connector comprises:
   an input connector including a plurality of electrical contacts for connection to said first power output; and
   an output connector electrically connected to the input connector, the output connector including a plurality of electrical contacts for connection to said second power input, whereby, the first power out put and the second power input are coupled together to transfer power from the network controller card to the data storage device, wherein power is supplied from the first power input of the network controller card to the data storage device via the series combination of the first power input, the power circuit, the first power output, the power connector and the second power input.

5. The network storage device of claim 4, wherein the power connector comprises a substantially C-shaped connector having a first end carrying the input connector, and a second end carrying the output connector.

6. The network storage device of claim 1, wherein the network controller card and the data storage device together fit into a disk drive storage bay of 4"×5.75"×1.625".

7. The network storage device of claim 1, wherein the data storage device is housed in the same enclosure as the network controller card.

8. The network storage device of claim 1, wherein the network controller card and the data storage device together fit into a disk drive storage bay of 4"×5.75"×1.0".

9. A digital data storage system comprising:
   a controller module for receiving and transmitting digital data from a network, the network carrying digital data, the controller module further including a first power input and a first power output, and additionally having an power circuit for providing electrical power from the first power input to the first power output; and
   a data storage module coupled to the controller module, the data storage module receiving and storing digital data sent from the controller module and recalling and transmitting digital data to the controller upon a request from the controller module, wherein the data storage module further includes a second power input coupled to the first power output of the controller module to power the data storage module via the power circuit of the controller module.

10. The digital data storage system of claim 9 wherein the controller module is configured to couple to an Ethernet network.

11. The digital data storage system of claim 9, wherein a single power input is coupled to the controller module, the single power input providing sufficient power to supply both the controller module and the storage module, the first power output and the second power input being coupled, together to transfer power from the controller module to the storage module via the power circuit of the controller module.

12. The digital data storage system of claim 11, further comprising a power connector for electrically connecting the first power output of the controller module and the second power input of the storage module to transfer power from the controller module to the storage module via the power circuit of the controller module.

13. The digital data storage system of claim 12, wherein the power connector comprises:
    an input connector including a plurality of electrical contacts for connection to said first power output; and
    an output connector electrically connected to the input connector, the output connector including a plurality of electrical contacts for connection to said second power input,
    whereby, the first power output and the second power input are coupled together to transfer power from the controller module to the storage module.

14. The digital data storage system of claim 13, wherein the power connector comprises a substantially C-shaped connector having a first end carrying the input connector, and a second end carrying the output connector.

15. The digital data storage system of claim 14, further comprising an attachment mechanism for mechanically attaching the controller module to the data storage module to form a single unit.

16. The digital data storage system of claim 14, further including an enclosure wherein the data storage module is housed in the same enclosure as the controller module.

17. The digital data storage system of claim 9, wherein the controller module and the data storage module together fit into a disk drive storage bay of 4"×5.75"×1.625".

18. The digital data storage system of claim 9, wherein the controller module and the data storage module together fit into a disk drive storage bay of 4"×5.75"×1.0".

19. A network storage device comprising:
a network controller card capable of being coupled to a network and receiving and transmitting files to and from the network, the network controller card including a first power input and a first power output, and additionally having an power circuit thereon for providing electrical power from the first power input to the first power output;
a data storage device attached to the network controller card by an attachment mechanism to form a single unit, the data storage device storing and later transmitting back files transmitted to the network storage device from the network, where in the data storage device further includes a second power input coupled to the first power output on the network controller card to electrically power the data storage device via the power circuit of the network controller card, such that when electrical power is supplied to said first power input, the network controller card receives sufficient power to supply both the network controller card and the data storage device.

20. The network storage device of claim 19, wherein the network controller card and the data storage device together fit into a disk drive storage bay of about 4"×5.75"×1.0".

21. The network storage device of claim 19, further comprising a power connector for electrically connecting the network controller card and the data storage device to transfer power from the network controller to the storage device.

22. The network storage device of claim 21, wherein the power connector comprises:
an input connector including a plurality of electrical contacts for connection to said first power source output; and
an output connector electrically connected to the input connector, the output connector including a plurality of electrical contacts for connection to said second power source input,
whereby, the first power output and the second power input are coupled together to transfer power from the network controller card to the data storage device.

23. The network storage device of claim 22, wherein the power connector comprises a substantially C-shaped connector having a first end carrying the input connector, and a second end carrying the output connector.

24. The network storage device of claim 19, a wherein the network controller card and the data storage device together fit into a disk drive storage bay of about 4"×5.75"×1.625".

25. A digital data storage system comprising:
a substrate for supporting electrical components and providing electrical interconnections therebetween;
a controller supported by the substrate, for receiving and transmitting digital data from a network, the network carrying digital data; and
a data storage module supported by the substrate and electrically interconnected to the controller the data storage module receiving and storing digital data sent from the controller and recalling and transmitting digital data to the controller upon a request from the controller.

26. The digital data storage system of claim 25 wherein the controller is configured to couple to an Ethernet network.

27. The digital data storage system of claim 25, further comprising a single power input on the substrate for receiving sufficient power to supply both the controller and the data storage module.

28. The digital data storage system of claim 25 wherein a first power input is coupled to the controller, the first power input receiving sufficient power to supply both the controller and the data storage module, a first power output is coupled to the controller for transferring power from the controller, and a second power input is coupled to the data storage module, the first power output and the second power input being coupled together to transfer power from the controller to the data storage module.

29. The digital data storage system of claim 25, wherein the substrate, the controller and the data storage module, together, fit into a disk drive storage bay of 4"×5.75"×1.625".

30. The digital data storage system of claim 25, wherein the substrate, the controller and the data storage module, together, fit into a disk drive storage bay of 4"×5.75"×1.0".

31. The digital data storage system of claim 25, wherein the substrate comprises a printed circuit board having electrical traces, such that the controller and the data storage module are supported by the printed circuit board and electrically interconnected via the electrical traces.

32. The digital data storage system of claim 25, further comprising:
an operating system for low level functions including scheduling and memory management;
a communication protocol that allows the controller to communicate over the network; and
whereby the controller transfers data between the data storage module and the network.

33. The digital data storage system of claim 25, wherein the controller comprises an application specific integrated circuit configured to perform said functions of the controller.

34. The digital data storage system of claim 25, wherein the controller comprises a network controller and the data storage module comprises a data disk drive.

* * * * *